United States Patent [19]
Kohama et al.

[11] Patent Number: 5,316,841
[45] Date of Patent: May 31, 1994

[54] LAMINATED SHEET FOR A LID OF A CONTAINER FOR INSTANT FOOD COOKED WITH HOT WATER

[75] Inventors: Yukio Kohama, Washimiyamachi; Kazunori Yamada, Atsugi; Toshiaki Watanabe; Chiaki Kanai, both of Chigasaki, all of Japan

[73] Assignee: Tokai Aluminum Foil Co., Ltd., Kanagawa, Japan

[21] Appl. No.: 75,906

[22] Filed: Jun. 14, 1993

Related U.S. Application Data

[63] Continuation of Ser. No. 780,943, Oct. 24, 1991, abandoned.

[30] Foreign Application Priority Data

Nov. 9, 1990 [JP] Japan ................................ 2-117850
Apr. 19, 1991 [JP] Japan ................................ 3-26951

[51] Int. Cl.⁵ .............................................. B32B 3/26
[52] U.S. Cl. .................... 428/319.1; 428/315.6; 428/315.5; 428/315.9; 428/461; 428/344; 428/910; 220/612; 220/626
[58] Field of Search ............ 428/319.1, 316.6, 315.5, 428/315.9, 344, 461, 910; 220/612, 626

[56] References Cited

U.S. PATENT DOCUMENTS 4,358,493 11/1982 Ohtsuki et al. .................... 428/35

Primary Examiner—George F. Lesmes
Assistant Examiner—Christopher W. Raimund
Attorney, Agent, or Firm—Bacon & Thomas

[57] ABSTRACT

A laminated sheet for a lid of a container for instant food cooked with hot water, comprising a metallic foil and a synthetic paper affixed to the metallic foil is disclosed. Self sealing of the container is achieved after the lid is partly peeled and hot water is poured into the container.

18 Claims, 1 Drawing Sheet

LAMINATED SHEET FOR A LID OF A CONTAINER FOR INSTANT FOOD COOKED WITH HOT WATER

This application is a continuation of application Ser. No. 07/780,943, filed Oct. 24, 1991, now abandoned.

BACKGROUND OF THE INVENTION

1) Field of the Invention

This invention relates to a laminated sheet for a lid of a container for instant food cooked with hot water and more particularly to a laminated sheet for a lid of a container usable for various instant foods such as noodles, which are cooked for eating simply by pouring hot water into the container.

2) Description of the Background Art

Conventionally, a lid of a container for instant food cooked with hot water is made of a laminated sheet which is composed of an aluminum foil and a paper affixed to the foil.

As shown in FIG. 3, for cooking this type of instant food, a lid a is firstly peeled off from the opening of a container b which contains instant food to be cooked, and hot water is poured into the container b. The peeled portion of the lid a is then bent toward the opening of the container b to seal the opening of the container b therewith, and the container b is allowed to stand for a few minutes to cook the instant food with hot water.

The conventional lid a, however, has a disadvantage in that the lid a curls upward due to the hot steam when hot water is poured into the container b, which leads to insufficient sealing of the opening of the container b. Therefore, it is normal practice that consumers put a plate or the like on the lid a as a weight, or the lid a is fixed to the container b with an adhesive tape.

Under the above circumstances, the present inventors have carried out studies, and have found that, in the case where a paper is used as an upper layer and affixed to the upper face of an aluminum foil to constitute a lid, the lid curls upward when hot water is poured into a container, because contraction of the paper due to emission of humidity therefrom is larger than the difference in thermal expansion rate between the aluminum foil and the paper, and that, in the Case where a paper is used as a lower layer and affixed to the lower face of an aluminum foil to constitute a lid, the lid curls upward when hot water is poured into a container, because expansion of the paper due to absorption of water is larger than the difference in thermal expansion rate between the aluminum foil and the paper. The present inventors have also found that the undesirable effect of water can be eliminated by using a synthetic paper, and that a desired sealing property of a lid can be obtained by making use of the difference in thermal expansion rate between a metallic foil and a synthetic paper. The present invention has been accomplished based upon these findings.

SUMMARY OF THE INVENTION

Accordingly, this invention provides an improved laminated sheet suitable for the use with a lid of a container for instant food cooked with hot water, which comprises a metallic foil and a synthetic paper affixed to the metallic foil.

Instant food in this invention means food which is contained in a container and is cooked by hot water poured into the container. An example of the instant food includes instant noodles.

A lid made of a laminated sheet according to this invention is capable of securely sealing the opening of a container for instant food by itself, without the use of a plate or an adhesive tape, after hot water is poured into the container.

DETAILED DESCRIPTION OF PREFERRED EMBODIMENTS

Preferred embodiments of the present invention will be explained hereinafter with reference to the drawings.

Figure 1:
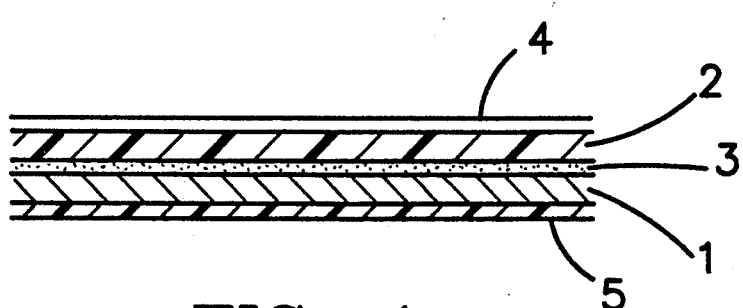
FIG. 1 is a sectional view of a laminated sheet according to a first embodiment of this invention.
Figure 2:
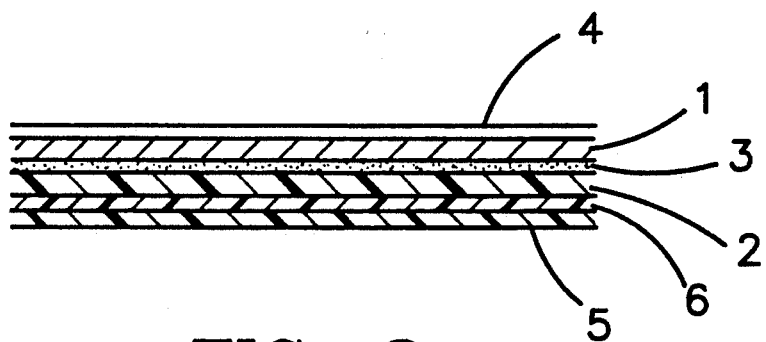
FIG. 2 is a sectional view of a laminated sheet according to a second embodiment of this invention.
Figure 3:
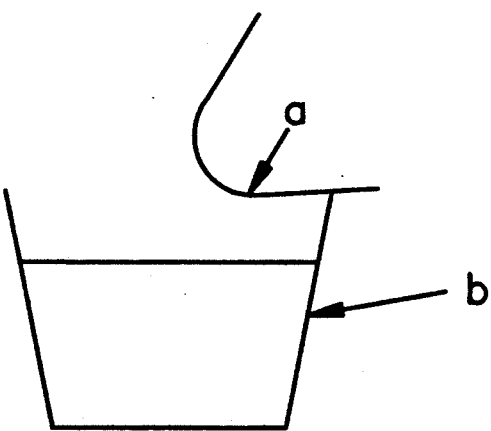
FIG. 3 is a schematic view showing a conventional container arrangement for instant food cooked with hot water.

Referring to FIGS. 1 and 2, indicated by 1 is a metallic foil having a stability against changes in temperature and humidity, and having a high heat transmission rate. Although any kind of metallic foils can be used, aluminum foil is preferable, and the preferable thickness thereof is 6 to 15 $\mu$m.

Indicated by 2 is a synthetic paper, and its preferable thickness is 60 to 100 $\mu$m. Examples of the synthetic paper include a biaxial stretching resinous film constituting a single layer having a large number of fine voids (microvoids) therein, and a laminated sheet composed of a resinous film having no fine voids therein and a biaxial stretching resinous film having fine voids therein affixed to one or both faces of the resinous film having no fine voids therein. Among resins usable in the present invention, polypropylene gives an excellent result. Preferable example of a synthetic paper having fine voids includes Yupo (trademark, product of Oji Yuka Goseishi K. K.).

The above-mentioned metallic foil 1 and synthetic paper are affixed to each other through an adhesive layer 3. Indicated by 4 is a layer on which an advertisement is printed and which is formed on the outside face (upper face) of the synthetic paper 2, and indicated by 5 is a layer of a heat seal resin formed on the inside face (lower face) of the metallic foil 1 for adhesion with a container body.

In the embodiment shown in FIG. 2, a layer 6 of cold sealer is formed between the metallic foil 1 and the heat seal resin layer 5 for adhesion of a peeled portion of a lid with the container without the use of heat. This layer 6 adheres with the opening end of the container when the peeled portion of the lid is caused to contact with the opening end after hot water is poured into the container. These layers 4, 5, 6 are formed when necessary.

This invention will further be explained by test examples, which should not be construed as limiting the invention thereof.

TEST EXAMPLE 1

A synthetic paper made of biaxial stretching polypropylene film containing fine voids therein and having a thickness of 80 $\mu$m (Yupo TPL-1 (trademark, product of Oji Yuka Gouseishi K. K., void ratio=33%)), and a soft aluminum foil having a thickness of 7 $\mu$m and coated with a sealing lacquer were affixed to each other through an adhesive layer to obtain a laminated sheet.

This laminated sheet was cut to form a lid having a shape corresponding to the dimension of the opening of a container for instant food cooked with hot water, and the lid was heat-sealed to the opening end of the container with a heated plate. This container was used as a test subject.

The lid of the subject was peeled off from the container, leaving a part of the lid affixed to the container. Thereafter, hot water was poured into the container to observe the movement of the lid. The peeled portion of the lid moved toward the container body and finally closed the opening of the container body after 10 seconds.

TEST EXAMPLE 2

A test subject was made in the similar manner using an art paper (paper coated on one face) of 79 g instead of the synthetic paper, and hot water was poured thereinto. The peeled portion of the lid moved toward the opposite direction with respect to the opening of the container body and did not close the opening of the container body. Similar phenomena occurred in cases where a high quality paper, cormorant paper or a coat paper were used.

TEST EXAMPLE 3

A test subject was made in the similar manner using a polyester film having a thickness of 50 μm instead of the synthetic paper, and hot water was poured thereinto. The peeled portion of the lid did not move at all and did not close the opening of the container body. Similar phenomenon occurred in case where a cellophane film was used.

TEST EXAMPLE 4

A test subject was made in the similar manner using a polypropylene film having a thickness of 25 μm instead of the synthetic paper, and hot water was poured thereinto. The peeled portion of the lid moved toward the container body, but stopped halfway and did not close the opening of the container body completely. A gap of about 20 to 30 mm was left between the lid and the container body. In practical use, this prevents noodles from being sufficiently cooked by its own heat.

TEST EXAMPLE 5

A test subject was made in the similar manner using a foamed thin sheet having a thickness of 30 μm instead of the synthetic paper, and hot water was poured thereinto. The peeled portion of the lid moved toward the container body, but stopped halfway and did not close the container completely.

TEST EXAMPLE 6

Although it was tried to make a test subject in the similar manner using a polyethylene film having a thickness of 25 μm instead of the synthetic paper, it failed. A lid using the polyethylene film could not be affixed to a container by heat-sealing, because the polyethylene film did not have thermal resistance.

Since a laminated sheet according to the present invention has the above-mentioned structure, a lid made of the laminated sheet is not affected by emission or absorption of humidity. Further, since the thermal expansion rate of the metallic foil is smaller than that of the synthetic paper, the lid a is prevented from curling upward due to the heat of hot water poured into the container b. Even if the lid a is once curled upward by the peeling force, the lid a is spontaneously bent toward the opening of the container b by itself, thereby achieving a sealed condition of the opening.

What is claimed is:

1. A peelable lid for a container of instant food adapted to be cooked by pouring hot water into the container consisting of essentially of
   a layer of metallic foil having first and second sides; and
   a layer of synthetic paper having a first side affixed to the second side of said layer of metallic foil, wherein said layer of metallic foil has an associated thermal expansion rate which is lower than that of said layer of synthetic paper such that when said lid is affixed to an open end of an instant food container and then partially peeled from the open end in order to pour hot water into the container to cook the instant food, the lid will tend to bend toward and sealingly engage the open end of the container.

2. A lid according to claim 1, wherein said metallic foil is an aluminum foil.

3. A lid according to claim 1, wherein said synthetic paper is a biaxial stretching resinous film having numerous fine voids therein.

4. A lid according to claim 3, wherein said biaxial stretching resinous film is polypropylene film.

5. A lid according to claim 3, wherein said metallic foil is an aluminum foil.

6. A lid according to claim 1, wherein said synthetic paper is a laminated sheet composed of a resinous film having no fine voids therein, and a biaxial stretching resinous film having a large number of fine voids therein affixed to at least one side if said resinous film having no fine voids therein.

7. A lid according to claim 6, wherein said resinous film and said biaxial stretching resinous film are polypropylene films.

8. A lid according to claim 7, wherein said metallic foil is an aluminum foil.

9. A lid according to claim 1, further comprising a heat sealing resin layer affixed to the first side of said layer of metallic foil.

10. A container assembly for storing and cooking instant food by pouring hot water therein comprising:
    a container body having an open end;
    a peelable lid covering the open end of said container body, said consisting essentially of a layer of metallic foil having first and second sides and a layer of synthetic paper having a first side affixed to the second side of said layer of metallic foil, wherein said layer of metallic foil has an associated thermal expansion rate which is lower than that of said layer of synthetic paper so that when said lid is partially peeled from the open end of said container body, said lid will tend to bend toward and sealingly engage the open end.

11. A container assembly according to claim 10, wherein said metallic foil is an aluminum foil.

12. A container assembly according to claim 10, wherein said synthetic paper is a biaxial stretching resinous film having numerous fine voids therein.

13. A container assembly according to claim 12, wherein said biaxial stretching resinous film is polypropylene film.

14. A container assembly according to claim 12, wherein said metallic foil is an aluminum foil.

15. A container assembly according to claim 12, wherein said synthetic paper is a laminated sheet composed of a resinous film having no fine voids therein, and a biaxial stretching resinous film having a large number of fine voids therein affixed to at least one side if said resinous film having no fine voids therein.

16. A container assembly according to claim 15, wherein said resinous film and said biaxial stretching resinous film are polypropylene films.

17. A container assembly according to claim 16, wherein said metallic foil is an aluminum foil.

18. A container assembly according to claim 10, wherein said lid further comprises a heat sealing resin layer affixed to the first side of said layer of metallic foil.

* * * * *

UNITED STATES PATENT AND TRADEMARK OFFICE
CERTIFICATE OF CORRECTION

PATENT NO. : 5,316,841

DATED : May 31, 1994

INVENTOR(S) : KOHAMA et al.

It is certified that error appears in the above-identified patent and that said Letters Patent is hereby corrected as shown below:

Claim 10, column 4, line 49 change "body, said consisting essentially" to

--body, said lid consisting essentially--.

Signed and Sealed this

Thirtieth Day of August, 1994

Attest:

BRUCE LEHMAN

Attesting Officer     Commissioner of Patents and Trademarks